Aug. 14, 1951  E. WILDHABER  2,563,895
FRICTION DRIVE
Filed March 27, 1948  3 Sheets-Sheet 1

INVENTOR.
ERNEST WILDHABER
BY
ATTORNEY

Aug. 14, 1951   E. WILDHABER   2,563,895
FRICTION DRIVE
Filed March 27, 1948   3 Sheets—Sheet 2
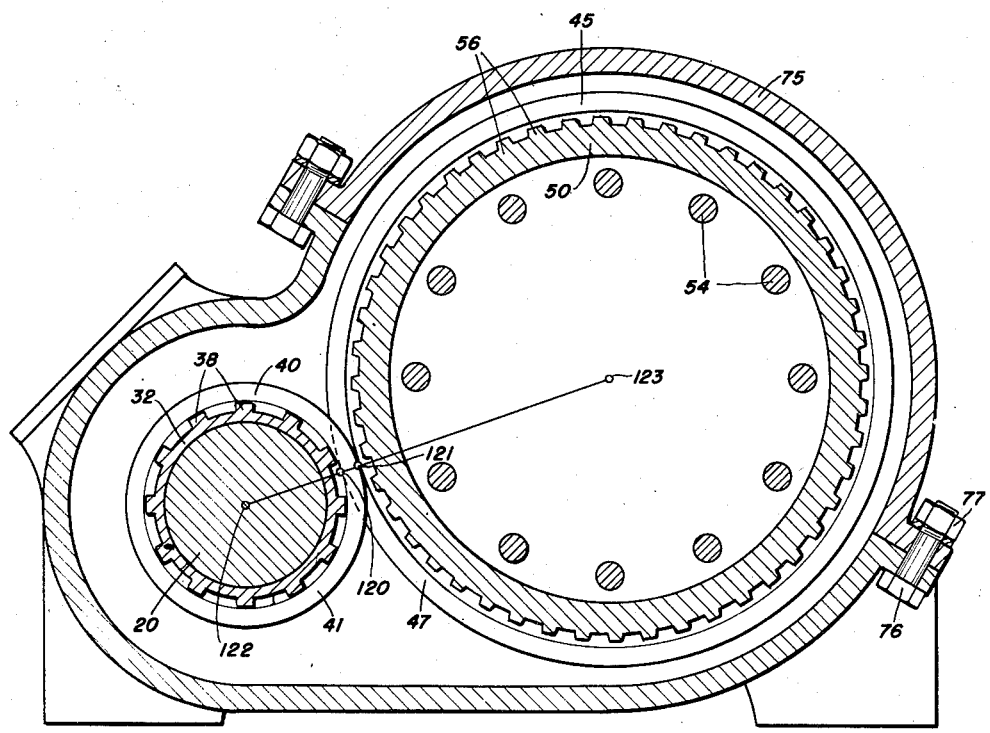
FIG. 4.
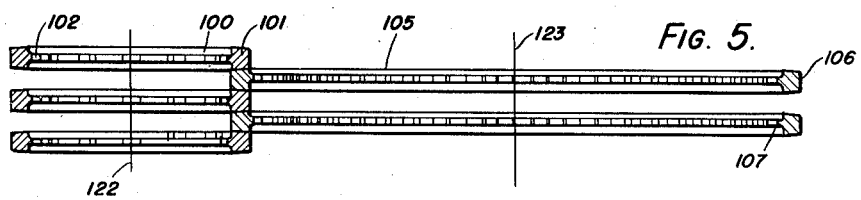
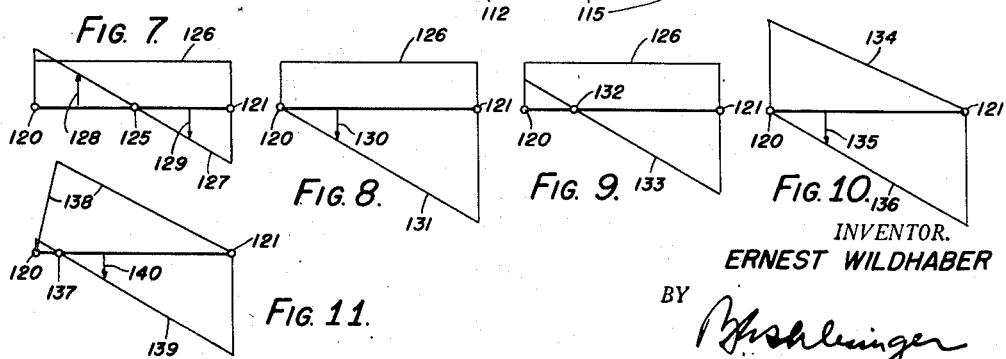
INVENTOR.
ERNEST WILDHABER
BY
ATTORNEY Aug. 14, 1951  E. WILDHABER  2,563,895
FRICTION DRIVE Filed March 27, 1948  3 Sheets—Sheet 3

INVENTOR.
ERNEST WILDHABER
BY
ATTORNEY

Patented Aug. 14, 1951

2,563,895

UNITED STATES PATENT OFFICE 2,563,895

FRICTION DRIVE

Ernest Wildhaber, Brighton, N. Y.

Application March 27, 1948, Serial No. 17,417

18 Claims. (Cl. 74—208)

The present invention relates to friction drives and particularly to friction drives which serve to connect two shafts which rotate on fixed axes and at a substantially constant speed ratio. More specifically the invention relates to drives of this character in which the friction surfaces are tapered or conical.

Friction drives have the advantage over gear drives that they have the capacity to dampen out or absorb vibration. They are also safe from overload because in a friction drive overloading simply causes slippage. Friction drives, however, have heretofore had the disadvantage that their efficiency is less than on that of an accurately-made spur or bevel gear drive. Moreover, they are more susceptible to wear than gear drives, and, while adjustment can be provided for taking up wear, unless the adjustment is made very carefully excess pressure may be applied, excess frictional losses may result, and the rate of wear may be increased.

In previous types of friction drives it has been customary to control the pressure of frictional engagement by resilient means such as springs, or in the case of V-belt drives, by the resilience of the belt or belts. In the V-belt drive, the tension of the belt controls the pressure of frictional engagement and the amount of torque which can be transmitted. With either springs or belt, the pressure of frictional engagement of necessity corresponds to the maximum torque which can be transmitted by the drive. When a smaller torque is being transmitted, then, the pressure is larger than necessary. Thus, at half the maximum torque, the pressure provided is double the amount which would be sufficient to carry the load. This excess pressure causes friction losses out of proportion with the torque transmitted. At fractional torques, then, in friction drives of known design the efficiency of frictional power transmission is poor.

One object of the present invention is to provide a friction drive which has increased efficiency.

A further object of the invention is to improve efficiency while still allowing slippage at overload.

Another object of the invention is to provide a friction drive which will insure slippage at a predetermined overload without having to rely on the skill of an operator.

Another object of the invention is to provide a friction drive in which for any load the contact pressure applied will be substantially proportional to the transmitted load.

A further object of the invention is to provide a friction drive having a "fool-proof" adjustment for taking up wear.

A still further object of the invention is to provide a friction drive in which the pressure of frictional engagement is controlled positively.

Still another object of the invention is to provide a friction drive in which a torque loader is used to apply the contact pressure and the friction surfaces of the drive are utilized for coupling and uncoupling the drive.

Other objects of the invention will be apparent hereinafter from the specification and from the recital of the appended claims.

In the drawings:

Fig. 4 is a section on the line 4—4 of Fig. 1;

Fig. 5 is an axial sectional view showing friction elements of modified form which may be used in a drive constructed according to this invention;

Fig. 6 illustrates a further modification of friction element which may be used in a friction drive constructed according to the invention;

Figure 12:
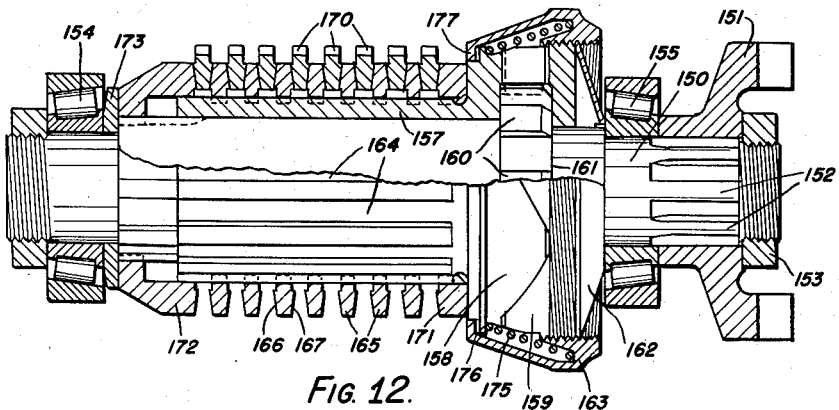
Figure 13:
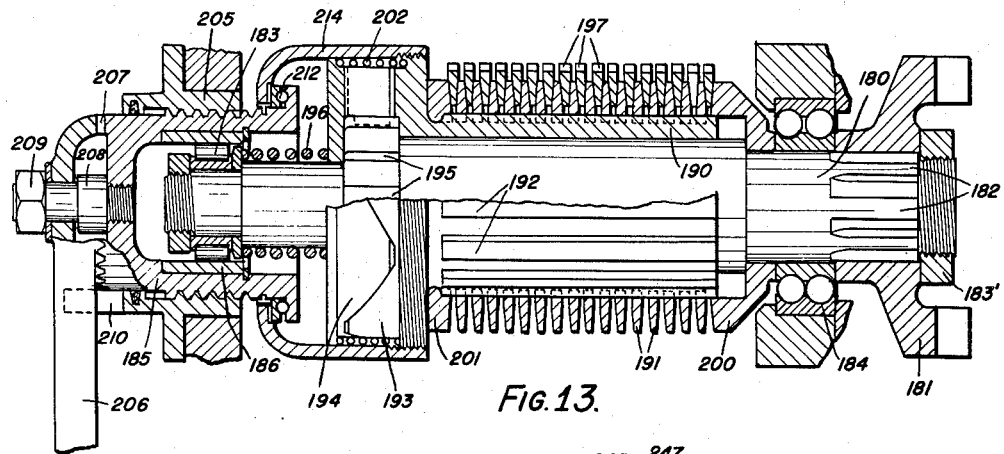
Figure 14:
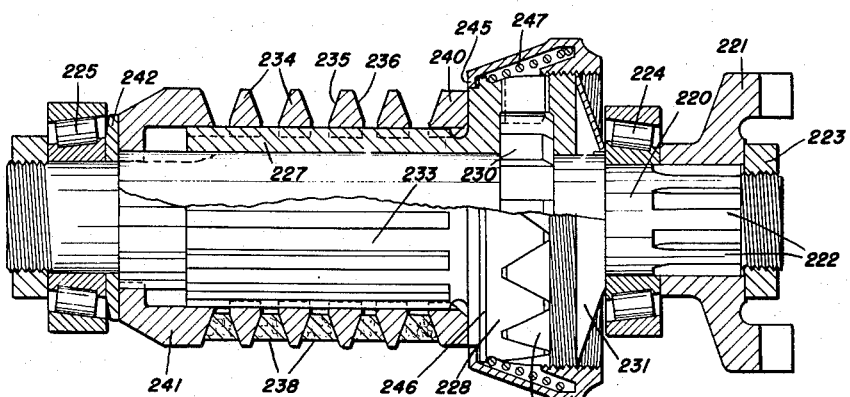

Figs. 7 to 11 inclusive are diagrams explaining principles underlying this invention;

Fig. 12 is a view, partly in axial section and partly in elevation, showing the drive portion of a friction drive constructed according to a further modification of the invention and which is particularly designed for drive in one direction only;

Fig. 13 is a view partly in axial section and partly in elevation of the drive portion of a friction drive constructed according to a further embodiment of the invention; and Fig. 14 is a view, partly in axial section and partly in elevation, illustrating an application of my invention to V-belt drives.

In a friction drive built according to this invention, torque is transmitted through a coupling having inclined, preferably helical, tooth sides, and one set of friction discs is keyed or splined to one member of this coupling. These friction discs, in a disc drive, mate with other friction discs on a parallel shaft, and, in a belt drive, engage V-belts which drive the parallel shaft.

The coupling member is preferably keyed to the smaller set of discs in a disc drive. The helical sides of the coupling teeth produce an axial pressure which increases with increase in the torque transmitted. With reduced torque, this pressure is correspondingly reduced. Friction losses out of proportion with the torque transmitted are thereby avoided.

Ordinarily the feature of slippage at a given overload, which is one prime advantage of the conventional friction drive, would be lost with a construction such as described since the pressure of frictional engagement increases substantially in proportion to the torque transmitted. I have provided, however, simple means to retain the feature of slippage on overload, while securing the advantage of having the pressure proportional to the transmitted torque.

Referring now to Figs. 1 to 4 inclusive, 20 and 21 denote, respectively, the two shafts of a drive constructed according to one embodiment of this invention. The shaft 20 is the high speed shaft and ordinarily the drive shaft. The shaft 21 is the low speed shaft and ordinarily the driven shaft.

The shaft 20 is provided on one end with splines 22. Connected to the shaft by means of these splines is one member 24 of a standard coupling through which power may be transmitted to or from the shaft. The shaft 20 is journaled in spaced anti-friction bearings 25 and 26; and the coupling member 24 is secured against the inner race of the bearing 25 by a nut 27 which threads onto the shaft.

The overall diameter of the shaft 20 is somewhat enlarged between the bearings 25 and 26; and the shaft is formed for a short part of its length with a portion of still further enlarged diameter. This is just to the left of bearing 25. This portion is provided with splines 28. One member 30 of a toothed face coupling is connected to the shaft 20 through these splines 28. Mounted upon the shaft between the splined portion 28 and bearing 26 is a sleeve 32. This sleeve is formed at its right hand end with a toothed face coupling member 31 which meshes with the face coupling member 30. Face coupling members are provided with teeth having helical sides, that is, sides inclined to their axis.

Face coupling member 30 is axially movable on the shaft and is constantly urged toward face coupling member 31 by a spring 34. This spring, which may be a conical disc spring of the Belleville type, presses against a plate 35. The spring 34 serves to hold the plate against a shoulder 36 formed on the shaft 20 at the juncture of the rear face of the splined portion 28 of the shaft with the adjacent right hand portion of the shaft. The rear face of the coupling member 30 seats against the front face of this plate 35.

The sleeve 32 is formed on its periphery with longitudinally extending splines 38. Mounted upon the sleeve 32 and connected thereto through the splines 38 are a plurality of friction discs 40. These discs, as shown, are of the conical type, having opposite sides 41 and 42 which are conical surfaces coaxial with the axis of shaft 20. The discs 40, through their splined connections with sleeve 32, are adapted to rotate with the sleeve but are free to move axially thereon.

The discs 40 engage mating discs 45 which have cooperating conical surfaces 46 and 47 at their opposite sides adapted to mesh with the surfaces 41 and 42, respectively, of discs 40.

The shaft 21 is a built-up shaft. It comprises a left hand portion 21', which is formed with an enlarged flange 48 at its right hand end, a right hand portion 21" which is formed with an enlarged flange portion 49 at its left hand end, and a central drum portion 50. The drum 50 is provided at opposite ends with face coupling teeth 51 and 52 which are adapted to engage mating face coupling teeth formed on the right hand and left hand faces, respectively, of the flange portions 48 and 49. Bolts 54 and nuts 55 serve to hold the inter-engaging face coupling teeth of drum 50 and flange members 48 and 49 in engagement so that the right hand and left hand portions 21' and 21" of the shaft 21 are rigidly connected with the drum portion 50. The bolts 54 pass through aligned holes in the flange portions 48 and 49.

The shaft 21 is mounted in the anti-friction bearings 43 and 44. The bearings 25, 26, 43, and 44 are mounted in caps or inserts 70, 71, 72, and 73 which are secured by screws (not shown) in the casing 75 of the drive. The casing 75 is made in two parts which are secured together by bolts 76 and nuts 77 as shown in Fig. 4.

The discs 45 are connected to the drum 50 through splines 56 provided on the periphery of the drum. The discs 45 therefore rotate with the drum because of their splined connection therewith but are free to move axially on the drum.

The axial positions of the mating discs 40 and 45 are determined by two end members 60 and 61. The end member 60 is connected to sleeve 32 through the splines 38. It has a conical end surface 42' on its left hand face which is adapted to engage the conical surface 47 of the furthermost right of discs 45. This end member 60 abuts at its right hand side against the back of the enlarged portion of the sleeve 32 upon which the coupling member 31 is formed. The end member 61 engages splines 63 formed upon shaft 20 at the portion of the shaft adjacent bearing 26. The end member 61 is formed on its right hand face with a conical surface 41' which is adapted to engage the conical surface 46 of the furthermost left of discs 45. The splines 63 of shaft 20 are threaded on their peripheries and the end member 61 is adapted to be adjusted axially on the shaft 20 by a nut 65 which threads onto the splines 63 and abuts against the end member 61. This nut permits shifting end member 61 axially to compensate for wear of the discs as will be described further hereinafter.

The discs 40 and 45 are held in engagement under a very light load by a weak spring 66 which may also be of the conical or Belleville type. This spring is disposed between the splined portion 28 of shaft 20 and the end of sleeve 32 upon which coupling member 31 is formed. In operation, however, the main pressure of engagement between discs 40 and 45 is supplied by the action of the helical tooth sides of mating coupling members 30 and 31.

In operation torque may be transmitted from coupling 24 to shaft 20 through splines 22 and thence through splines 28 and coupling members 30 and 31, splines 38 of sleeve 32, friction discs 40 and 45, and splines 56 to shaft 21. During drive, an axial pressure is created between coupling members 30 and 31 which is proportional to the torque transmitted and which depends upon the lead of the mating helical surfaces of the teeth 76 and 77 of the coupling members 30 and 31. The lead of these helical surfaces is selected to provide pressure suitable to maintain frictional engagement of discs 40 and 45 under all loads which the drive is designed to carry.

This pressure tends to separate the two coupling members.

Of these two coupling members, the member 30 is, as it were, rigidly secured to shaft 20 under all normal loads, that is, under all loads within the design capacity of the drive, for the spring 34 is designed to be strong enough to take all axial loads occurring in normal operations. The spring is designed to yield, however, at a predetermined overload. Normally, then, the axial load created in the coupling teeth tends to push clutch member 31 to the left toward adjustment nut 65 so that the frictional discs 40 and 45 are put under a suitable pressure in proportion to the transmitted torque. At the predetermined overload, however, the spring 34 will yield and let plate 35 and coupling member 30 move to the right. The movement of coupling member 30 to the right is limited, however, by a stop nut 80 which is threaded on the periphery of coupling member 30. This nut has a flange 81 at its left hand end that is adapted to engage the left hand or back face 83 of coupling member 31.

When the flange 81 of nut 80 engages the back face 83 of coupling member 31, the rightward movement of coupling member 30 is stopped. The coupling members are then locked during the period of overload; and as long as overload occurs, no further pressure can be exerted between mating discs 40 and 45. The pressure that can be transmitted through the discs is equal then to the spring pressure of spring 34 and no more. The maximum torque transmitted through the discs corresponds, then, to this pressure. Beyond this pressure point, slippage occurs, reducing any overload torque to the amount corresponding to the pressure that can be exerted by the spring. Thus, through the construction described, the friction drive of the present invention is guarded against overload.

The nut 80 can be adjusted on coupling member 30 to a desired distance to space flange 81 from shoulder 83. It is prevented from working loose by teeth 85 provided on the periphery of plate 35 which engage in slots 86 provided on the right hand face of the nut 80. Since plate 35 is continuously under spring pressure it will safely secure nut 80 against rotation.

The drive shown is fully enclosed and may be operated wet, that is, with any suitable kind of lubrication whether liquid or mist. Dry operation is also possible. Dry operation permits of employing parts of smaller dimension in the drive but they are apt to be subject to greater wear. Wear can be kept to a minimum by ample dimensions. This increases the cost and weight of the drive, however. With severe service, wear always has to be taken into consideration. For this reason it is best to provide some means for overcoming or offsetting wear. With my invention, adjustment for wear is provided.

Figure 1:
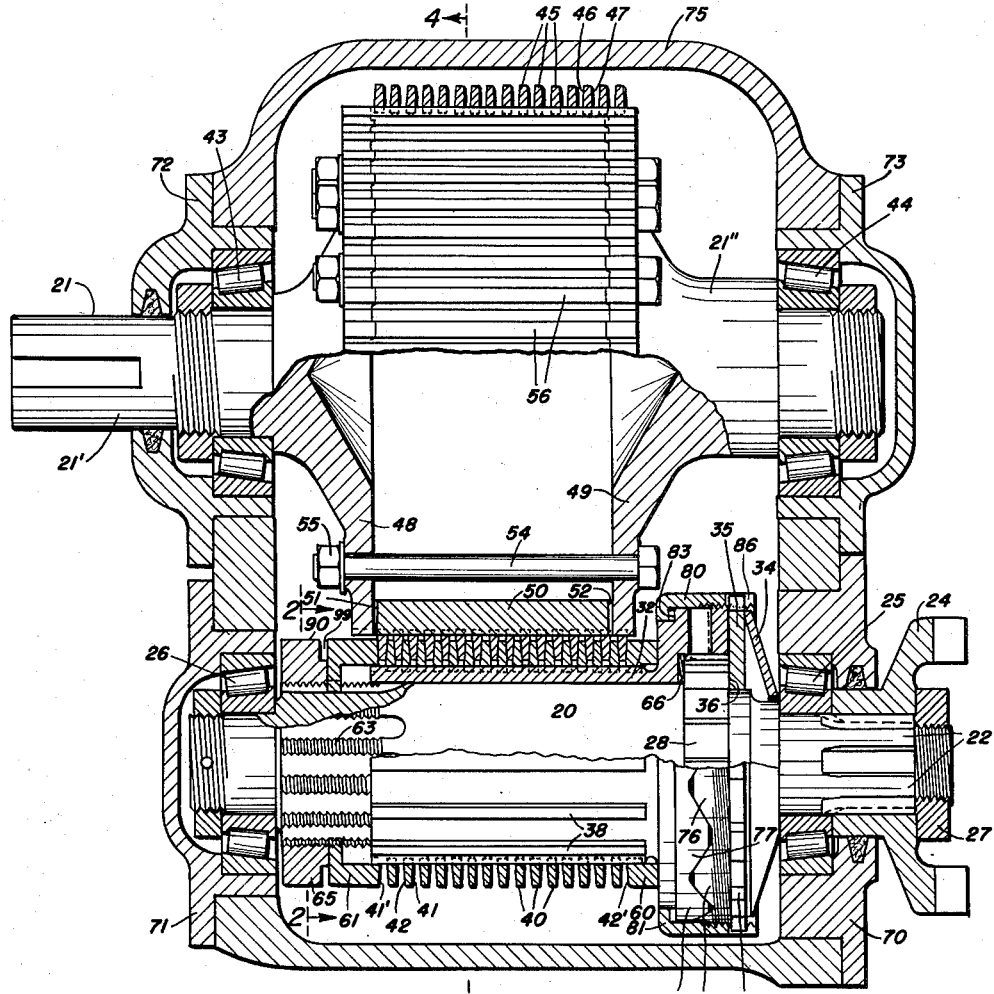
Fig. 1 is a part axial section, part elevational view of a friction drive constructed according to one embodiment of the present invention.

Wear changes the thickness of the mating discs 40 and 45 and gradually reduces the distance between the end members 60 and 61 when the discs are in contact. This reduction in distance may be compensated for in a drive constructed as shown in Fig. 1 by adjustment of nut 65. The nut is rotated on threaded splined portion 63 of the shaft 20 to adjust end member 61 toward end member 60. Through this adjustment the backlash between the teeth of coupling members 30 and 31 can be kept small at all times regardless of the wear of the discs 40 and 45. This is especially valuable when the load is applied alternately to opposite sides of the teeth, that is, when the drive is reversable.

Figures 2, 3:
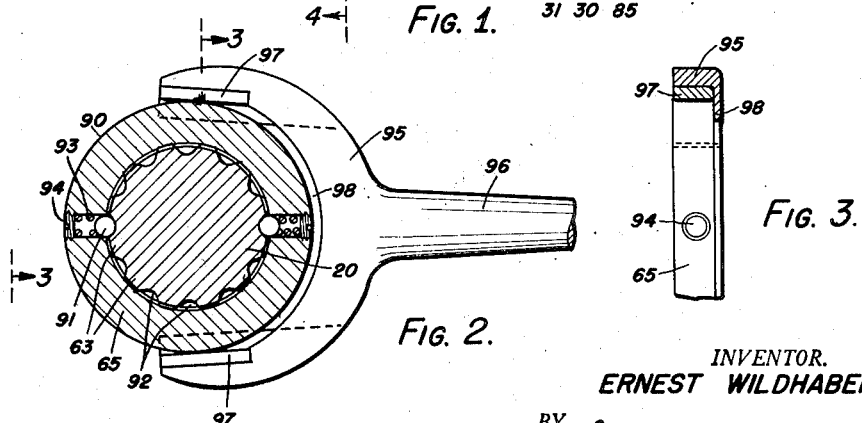
Fig. 2 is a section taken on the line 2—2 of Fig. 1 and showing, also, a "fool-proof" tool for adjusting the nut to take up wear.
Fig. 3 is a fragmentary view, partly in elevation and partly in section, taken on the line 3—3 of Fig. 2.

I have provided a means for making the adjustment of nut 65 "fool-proof" so as to prevent setting up undue pressures between the mating discs which might score the surfaces of the discs. For this purpose, a nut 65 is provided that has a continuous cylindrical outside surface 90 of rough finish. It is without any notches on its surface such as are ordinarily provided on adjustable nuts for engagement by an adjusting tool. A special tool 95 is provided for effecting adjustment of this nut. This tool has a handle or shank portion 96 and is forked to straddle the nut as shown in Fig. 2. It has two plane surfaced contact pads 97 secured to the insides of its furcations which are slightly tilted toward each other from the ends of the furcations of the tool to the shank portion 96 thereof. The tool has, in addition, a flange portion 98 on one side which is adapted to be engaged in a recess 99 (Fig. 1) formed on the nut 65. The flange 98 is of slightly greater thickness than recess 99 so that when the tool is engaged with the nut 65 the flange 98 of the tool will extend slightly to the right further than the end of the nut and contact the end member 61. The nut is adapted to be locked in any adjusted position on shaft 20 by ball detents 91 which engage in the recesses 92 formed between the splines 63 of shaft 20. The balls 91 are held in locking position by coil springs 93 which are interposed between the balls 92 and nuts 94 that are threaded into the nut.

To adjust the nut, the handle 96 of the tool is pressed radially toward the axis of shaft 20 until the pads 97 securely engage the peripheral surface of the nut; and then the tool is turned to effect adjustment. The adjustment of the nut is bound to end when the flange 98 of the tool becomes tight between the nut 65 and end member 61. The turning motion of the tool is then slightly reversed, preferably to the nearest ball stop, and the tool is removed.

With this construction, the discs 40 are left without any initial pressure other than that provided by the light spring 66; and the flange 81 of nut 80 is separated from the back face 83 of sleeve 32. For good support, the diameter of the coupling members 30 and 31 is made larger than the diameter of the discs 40, that is, the discs have a smaller outside diameter than the coupling members.

Friction discs of various types may be employed in a drive constructed according to the present invention. In Fig. 5 there are shown friction discs of slightly modified form which may be used in the drive of Figs. 1 to 4 inclusive as substitutes for the discs 40 and 45. The discs 100 and 105 of Fig. 5 have wider rim portions 101 and 106, respectively, than the splined portions 102 and 107 of these discs which are adapted to engage the splines 38 and 56, respectively, of sleeve 32 and drum 50. Wear does not alter the inside and outside diameters of the working portions 101 and 106 of discs 100 and 105; the width of the frictional working portions does not change with wear.

Discs 105 are ring shaped and are intended to be mounted upon a splined drum such as shown at 50 in Fig. 1. Fig. 6 shows a disc 110 which is suitable for mounting upon a splined shaft rather than a drum. The disc 110 has a wide rim portion 111 but has a smaller bore 114 than disc 105. It has a web portion 112 connecting rim 111 with bore 114. The bore 114 is of a diameter suitable for mounting upon a splined shaft and the bore is provided with splined portions 115 to engage the splines of the shaft.

The principles underlying frictional transmission of torque between mating sets of tapered frictional discs will now be described. It is upon these principles that the improved drive of the present invention is based.

Mating discs 40 and 45 have narrow working strips bounded by points 120 and 121 (Fig. 4). For transmission of torque, pure rolling without slippage exists at a point somewhere between the two end points 120 and 121. This point is equivalent to the pitch point in gearing. Let $r$ and $R$ denote the radii from the axes 122 and 123 of the two shafts 20 and 21 (Fig. 4) to this pitch point. Ordinarily, the discs 40 and 45 have conical friction surfaces. These contact mathematically along a line which under load may spread out to an area extending along the line of contact. The width of this area depends on the intensity of the load, on the taper of the discs, and on the elastic properties of the material of the discs. This material is preferably metal as, for instance, hardened steel or alloy steel. I may also use aluminum, or cast iron; or the discs may be made from pressed and sintered iron powder treated with some kind of a lubricating agent, or from any other suitable material.

When the width of the area of contact is small as compared with its length 120—121, the result on the efficiency of the drive is practically the same as if the load were concentrated along the line of contact. The efficiency will now be so determined. An important factor is the distribution of the load along the line of contact. The simplest possible distribution is a uniform load as assumed in the diagrams of Figs. 7 to 9 inclusive.

Fig. 7 illustrates a condition where the pitch point 125 is midway between the end points 120 and 121 of the line of contact. The constant ordinates of line 126 indicate the assumed constant pressure at all points along the line of contact. The ordinates of line 127 indicate the relative sliding velocity which is proportional to the distance from the pitch point. It is opposite at opposite sides of the pitch point as shown by arrows 128 and 129. The resulting friction loads are equal and opposite on the two halves 120—125 and 125—121 of the line of contact so that under these conditions practically no frictional torque is transmitted by the drive.

It is apparent, then, that in service the pitch point cannot be midway between the end points of the line of contact. The pitch point may be so located in idling, however, when the contact pressure is obtained from a spring as in many known designs of friction drives.

The friction loss will now be determined for the condition, where the pitch point is midway the line of contact. Use will be made of the following symbols in addition to $r$ and $R$:

$t$ = the length of the line of contact = distance 120—121

$x$ = the distance of any considered point of said line from the pitch point, here assumed at 125

$m$ = the coefficient of friction $P$ = the total normal load on the line of contact $v$ = the peripheral velocity at the pitch point $$C = \left(\frac{1}{r} + \frac{1}{R}\right)$$

The sliding velocity at any point of the line of contact having an abcissa $x$ is then:

$$x \cdot v \cdot \left(\frac{1}{r} + \frac{1}{R}\right) = x \cdot v \cdot C$$

as will readily be understood.

The pressure received by an element $dx$ at the same point amounts to:

$$\frac{P}{t} \cdot dx$$

The corresponding frictional force is:

$$m \cdot \frac{P}{t} \cdot dx$$

The energy lost in friction at the considered point amounts, therefore, to:

$$m \cdot \frac{P}{t} \cdot v \cdot C \cdot x \cdot dx$$

$x \cdot dx$ is like a vertical surface element of a right triangle whose one corner is at the pitch point 125; whose base is 125—121 = ½$t$; and whose ordinate at 121 is also ½$t$. The area of this triangle amounts to $$\frac{t^2}{8}$$

The total energy lost through friction on one side of the pitch point amounts thus to:

$$m \cdot \frac{P}{t} \cdot v \cdot C \cdot \frac{t^2}{8}$$

and on both sides of the pitch point amounts to twice that quantity. The total loss of energy $E_f$ is therefore:

$$E_f = m \cdot P \cdot v \cdot C \cdot \frac{t}{4}$$

Fig. 8 illustrates a case where the pitch point coincides with end point 120 of the line of contact. In this instance sliding is all in the same direction 130 along the whole length of the line (120—121) of contact. The ordinates of line 131 then indicate the relative sliding velocity. At any considered point having a distance $x$ from the new pitch point 120, the energy $dE_f$ lost in friction amounts, as before, to:

$$dE_f = m \cdot \frac{P}{t} \cdot v \cdot C \cdot x \cdot dx$$

and the total energy lost amounts to:

$$E_f = m \cdot P \cdot v \cdot C \cdot \frac{t}{2}$$

The friction load under this condition is all in the same direction and adds up to: $m \cdot p$.

The energy input $E$ is substantially:

$$E = m \cdot P \cdot v$$

The proportion of lost energy $E_f$ to energy input $E$ is thus in this new case approximately:

$$\frac{E_f}{E} = C \cdot \frac{t}{2}$$

Fig. 9 illustrates an intermediate case where the pitch point is at 132 at a distance ¼$t$ from end point 120. Broadly the distance may be assumed as $q \cdot t$, where $q$ lies between zero and ½. In this case, the ordinates of line 133 indicate the relative sliding velocity. The energy $dE_f$ lost in friction is the same as above, and the total energy lost is:

$$E_f = m \cdot \frac{P}{t} \cdot v \cdot C \cdot \tfrac{1}{2}[(qt)^2 + (1-q)^2 t^2]$$

or:

$$E_f = m \cdot P \cdot v \cdot C \cdot t \cdot \frac{q^2 + (1-q)^2}{2}$$

The useful friction load is the difference between the friction load exerted along distance 132—121 and the friction load exerted along distance 120—132, and is computed as follows:

$$m \cdot \frac{P}{t}[(1-q)t - qt] = m \cdot P \cdot (1-2q)$$

The energy input is approximately:

$$E = m \cdot P \cdot v \cdot (1-2q)$$

and:

$$\frac{E_f}{E} = C \cdot t \cdot \frac{q^2 + (1-q)^2}{2(1-2q)} = \tfrac{1}{2} \cdot C \cdot t \left[1 + \frac{2q^2}{(1-2q)}\right]$$

In the illustrated instance where $q = \tfrac{1}{4}$, the amounts are:

$$\frac{E_f}{E} = \tfrac{1}{2} C \cdot t (1 + \tfrac{1}{4}); \text{ and } E = \tfrac{1}{2} m \cdot P \cdot v$$

Obviously, then, with a reduction of the torque to one half of the amount corresponding to Fig. 8, the loss proportion has been increased by 25%. As an example let $$t = \frac{r}{10} \text{ and } R = 3r$$

$C \cdot t$ is then $\frac{4}{30}$

The loss proportion under the conditions of Fig. 8, then, is $\tfrac{1}{15}$, while under the conditions of Fig. 9 it is $\tfrac{5}{60}$ or $\tfrac{1}{12}$.

Actually the pressure does not stay uniformly distributed over the line of contact. The portions under more sliding will wear down and reduce the pressure at these portions especially in a drive with fixed axes. The reduction in pressure continues until the wear tendencies are the same at all points. The final pressure is high at the pitch point and drops down with increasing distance from the pitch point.

Fig. 10 corresponds to Fig. 8 in so far as the pitch point coincides with the end point 120 of the line of contact between the discs. The ordinates of the line 136 indicate the relative sliding velocity, which is all in the same direction as denoted by the arrow 135. Here, however, the assumed pressure distribution is no longer constant but varies along the line of contact in the manner indicated by straight line 134. This linear distribution along straight line 134 is assumed for simplicity. Actually, the distribution line is likely to be a concave curve, for the pressure is higher than line 134 indicates at and near the pitch point and lower than line 134 indicates at points more distant from the pitch point where sliding is larger. Such a concave curve would show still less computed loss. The assumed straight line 134 gives a fair picture. While its pressure distribution is less favorable than the actual distribution we have made here the assumption that the load is concentrated along the line of contact. This assumption is favorable to the result.

In Fig. 10, the pressure at an element having an abscissa $x$ amounts to:

$$\frac{2P}{t} \cdot dx \cdot \frac{t-x}{t}$$

The energy $dE_f$ lost through friction in this element is the product of the friction force $$m \cdot \frac{2P}{t} \cdot dx \cdot \frac{t-x}{t}$$

and the sliding velocity $x \cdot v \cdot C$, that is:

$$dE_f = m \cdot \frac{2P}{t^2} \cdot v \cdot C (t \cdot x \cdot dx - x^2 \cdot dx)$$

The total energy $E_f$ lost along the whole length of the line of contact is found to be:

$$E_f = m \cdot \frac{2P}{t^2} \cdot v \cdot C \cdot \left(t \cdot \frac{t^2}{2} - \frac{t^3}{3}\right) = m \cdot \frac{P}{3} \cdot v \cdot C \cdot t$$

The friction load extends in one direction only and amounts to $m \cdot P$. The input energy amounts approximately to:

$$E = m \cdot P \cdot v$$

and the loss proportion is therefore:

$$\frac{E_f}{E} = C \cdot \frac{t}{3}$$

This amounts to $$\frac{4}{90} = .0444 \text{ or } 4.44\%$$

in the above numerical example.

In the more general case illustrated in Fig. 11, the pitch point is at 137 at a distance $q \cdot t$ from end point 120. The pressure distribution is indicated by broken line 138. It increases from end point 120 to pitch point 137 and then decreases again to end point 121. The pressure on an element $dx$ immediately adjacent the pitch point 137 is the same as in the case of Fig. 10. It amounts to:

$$\frac{2P}{t} \cdot dx$$

At a point of the abscissa $x$ it is:

$$\frac{2P}{t} \cdot dx \cdot \frac{t(1-q) - x}{t(1-q)}$$

When $x$ is negative it is:

$$\frac{2P}{t} \cdot dx \cdot \frac{t \cdot q + x}{t \cdot q}$$

The energy $dE_f$ lost through friction in the considered element when $x$ is positive is:

$$dE_f = m \cdot \frac{2P}{t^2} \cdot v \cdot C \cdot \left[t \cdot x \cdot dx - \frac{x^2 \cdot dx}{(1-q)}\right]$$

The total energy lost in the region of positive $x$ is:

$$m \cdot \frac{2P}{t^2} \cdot v \cdot C \left[\frac{t^3(1-q)^2}{2} - \frac{t^3(1-q)^2}{3}\right] = m \cdot \frac{2P}{6} \cdot v \cdot C \cdot t \cdot (1-q)^2$$

In the region of negative $x$ it is:

$$m \cdot \frac{2P}{6} \cdot v \cdot C \cdot t \cdot q^2$$

This energy $E_f$ adds up to:

$$E_f = m \cdot \frac{P}{3} \cdot v \cdot C \cdot t[(1-q)^2 + q^2]$$

The friction force in the region 137—121 amounts to:

$$m \cdot P(1-q)$$

The friction force in the region 120—137 is of opposite direction and amounts to:

$$m \cdot P \cdot q$$

The useful friction force is the difference:

$$m \cdot P \cdot (1-2q)$$

The input energy amounts to approximately:

$$E = m \cdot P \cdot v \cdot (1-2q)$$

The loss proportion is therefore:

$$\frac{E_f}{E} = C \cdot \frac{t}{3} \cdot \frac{(1-q)^2 + q^2}{1-2q}$$

or:

$$\frac{E_f}{E} = C \cdot \frac{t}{3} \left[ 1 + \frac{2q^2}{1-2q} \right]$$

At half frictional torque, as compared with Fig. 10, $q$ equals $\frac{1}{4}$. Hence:

$$\frac{E_f}{E} = C \cdot \frac{t}{3} \cdot \frac{5}{4} = C \cdot t \cdot \frac{5}{12}$$

This amounts to $$\frac{2}{36} = .0555 \text{ or } 5.55\%$$

in the above numerical example. At three-quarters frictional torque, $q$ is $\frac{1}{8}$ and:

$$\frac{E_f}{E} = C \cdot \frac{t}{3} \cdot \frac{25}{24}$$

which is .0463 in the example, or 4.63%.

The torque transmission may be kept near this region of $q = \frac{1}{8}$ by proper selection of the lead of the sides of the teeth of the helical coupling members 30 and 31. The friction losses can then be kept within 5%.

With moderate taper of the profiles of the friction discs 40 and 45, the axial pressure is substantially equal to the normal pressure P. If $a$ denotes the inclination of the disc profiles to a plane of rotation, the axial pressure $P_a$ equals $P \cdot \cos a$. The torque transmitted for instance through the discs 40 (Fig. 1) of smaller diameter and end member 60, where there are $n$ friction contacts, is approximately:

$$m \cdot P \cdot n \cdot r (1-2q)$$

In Fig. 1 there are 30 frictional contacts on the fifteen friction discs 40, and one on end member 60; $n$ equals 31.

A lead L of the helical surfaces of the teeth of the coupling members 30 and 31 produces an axial force $P_a$ proportional to the torque transmitted, or:

$$Pa = \frac{2\pi}{L} \cdot (\text{torque})$$

that is:

$$Pa = \frac{2\pi}{L} \cdot m \cdot P \cdot n \cdot r(1-2q)$$

Hence:

$$L = m \cdot n (2\pi r) \cdot \frac{(1-2q)}{\cos a}$$

A further embodiment of the invention is illustrated in Fig. 12. The modification here shown is intended especially for cases where the driving torque rarely, if ever, reverses. In such a case it does not matter if backlash is gradually formed between the coupling teeth due to wear.

In Fig. 12, only one shaft of the drive is shown. This shaft is denoted at 150. It is adapted to be connected to a source of power through a coupling, one member of which is shown at 151. This coupling member is connected to shaft 150 by splines 152 and by nut 153 which threads on the end of the shaft. The shaft is journaled in antifriction bearings 154 and 155. It has a sleeve 157 mounted on it which has a coupling member 158 formed integral with it at one end. This coupling member engages with a mating clutch member 159 which is connected to the shaft 150 through splines 160 which are formed on an enlarged portion of the shaft. Coupling member 159 is pressed against a shoulder 161, which is formed at the juncture of the splined portion 160 of the shaft with the right hand portion of the shaft, by a conical Belleville spring 162. This spring is strong enough to hold the coupling member there under all normal load conditions. It is designed to yield at a predetermined overload. A stop is provided to limit axial displacement of clutch member 158 away from clutch member 159. This stop takes the form of a nut 163 which threads onto the outside of coupling member 159. This nut has a flange 177 which is adapted to engage a flange or shoulder 176 formed on coupling member 158.

The sleeve 157 is provided on its periphery with splines 164. Mounted upon the sleeve are a plurality of friction discs 165 which are connected to the sleeve through the splines 164. These discs have conical opposite side surfaces 166 and 167 which engage with conical surfaces formed on opposite sides of mating discs 170 which may have splined connection with the drum portion 50 of the shaft 21 (Figs. 1 and 4).

Contact pressure between the mating discs 165 and 170 is maintained by end members 171 and 172. End member 171 is disposed between the farthermost right of the friction discs 170 and the shoulder formed by the enlarged coupling portion 158 of sleeve 157. End member 171 is connected to sleeve 157 through the splines 164. The end member 172 is held in fixed axial position by a ring 173 which is tight between a shoulder of shaft 150 and the inner race of bearing 154.

As before, the coupling members 158 and 159 have teeth with helical side surfaces or approximations thereof. The lead L of said tooth sides may be determined as before. A light coil spring 175, which is disposed on the inside of the nut 163 serves to maintain engagement between the friction discs. Nut 163 is screwed on from the left with the spring 175 inside of it. To disassemble, the nut 163 is rotated to move it to the left. In this way the spring 175 is compressed. Thereby it gradually increases in diameter and finally slips over the retaining shoulder 176 formed on coupling member 158.

When wear occurs, coupling member 158 gradually moves away axially from coupling member 159 because of the pressure of the helical tooth sides of the torque loader. The friction discs are thereby kept under pressure in proportion to the torque transmitted. When it becomes necessary to effect adjustment because of wear, the nut 163 is rotated to move its flange portion 177 along with coupling member 158. Engagement of the flange 177 of the nut with the shoulder 176 formed on coupling member 158 provides against excess overload. If the overload provision and the spring 162 were eliminated, no stop and no adjustment would be necessary.

Another embodiment of the invention is illustrated in Fig. 13. Again only one shaft and its associated parts are shown. This shaft is denoted at 180. It is adapted to be driven from an outside source of power through the coupling 181, which is connected to the shaft by the splines 182 and the nut 183'.

The shaft is journaled in anti-friction bearings 183 and 184. Bearing 184 is of the type to take axial thrust in both directions. Bearing 183 is a cylindrical roller bearing whose rollers bear against an outer race 186 which has no shoulders. The bearing race 186 is mounted in an adjusting sleeve 185 which will be referred to later.

Mounted upon the shaft 180 is a sleeve member 190. The sleeve member carries friction discs 191 which are connected to the sleeve through the splines 192 formed on the sleeve. The friction discs 191 are, therefore, free to move axially on the sleeve. The sleeve is formed at its left hand end integral with a face coupling member 193 having teeth with helical side tooth surfaces. This coupling member is adapted to engage a mating face coupling member 194 that is connected to shaft 180 through splines 195 formed on an enlarged portion of the shaft. The coupling member 194 is pressed against the shoulder formed at this enlarged portion of shaft 180 by a coil spring 196. Spring 196 is designed to yield only on overload.

The friction discs 191 engage mating friction discs 197 that may be secured to a drum member 50 of a shaft such as shaft 21 (Fig. 1). Contact pressure between the discs 191 and 197 is maintained through two end members 200 and 201. End member 200 is interposed between the inner race of bearing 184 and the disc 197 which is furthermost to the right of the series 197. End member 201 is interposed between the coupling member 193 and that disc of series 197 which is furthermost to the left.

The drive is from coupling member 181 through shaft 180, coupling member 194, coupling member 193, sleeve 190, and friction discs 191 and 197 to the shaft to which these latter discs are connected. A light coil spring 202 tends to separate the two coupling members 193 and 194 and keep the friction discs in contact.

The sleeve member 185, to which the outer race 186 of bearing 183 is secured, is threaded on its periphery. This sleeve member threads into a stationary nut 205. A crank or lever 206 is secured to the sleeve 185 through a toothed face-coupling 207. The teeth of this coupling are held in fixed engagement by a bolt 208, which threads into the outer end of sleeve 185, and by a nut 209, which threads onto the bolt. By turning lever 206 sleeve 185 may be moved to the left. This brings the thrust bearing 212, which is carried by the sleeve, into contact with the cup-shaped member 214, which threads onto the outside of coupling member 193. When the thrust bearing 212 engages this cup member, the cup member and coupling are both moved to the left also. In this way, contact pressure between the friction discs 191 and 197 may be released, and the drive disengaged. It is re-engaged by turning the lever 216 back. Suitably spaced stops 210 may be provided to limit the movement of lever 206 in both directions. Means may also be provided, if desired, for securing the lever in either of its end positions.

As the fraction discs become thin through wear, the member 214 moves to the right. For proper operation of the drive, threaded sleeve 185 should, then, also be moved to the right. This adjustment for wear is accomplished by loosening nut 209, disengaging toothed coupling 207 and turning the lever 206 with respect to sleeve 185 through the space of one or more teeth of the coupling before re-engaging the coupling. Nut 209 is then tightened again. In this way, a very simple adjustment for wear is accomplished. The design of Fig. 13 also contains provision for overload release through spring 196 which is designed to be strong enough to hold discs 191 and 197 under any contact pressure until a predetermined overload occurs. Spring 196 will yield at this overload.

An application of my invention to V-belt drives is shown in Fig. 14. This figure is similar to Fig. 12 and like the embodiment shown in Fig. 12 has provision for slippage at overload and means for taking up wear.

Power may be transmitted to the shaft 220 through a coupling member 221 which is keyed to the shaft by keys 222 and secured axially by a nut 223 that threads onto the shaft. The shaft is journaled on anti-friction bearings 224 and 225. Mounted upon the shaft for axial and rotary movement thereon is a sleeve 227 which has formed integral with it at its right hand end a coupling member 228. This coupling member engages a mating coupling member 229 which is connected to shaft 220 by splines 230. A Belleville spring 231 acts against the coupling member 229 and maintains it in a fixed axial position during ordinary operation. This spring is interposed between the coupling member 229 and the inner race of bearing 224, and determines the amount of maximum axial pressure that can be carried by the drive. In other words, it determines the point of overload.

The sleeve 227 has splines 233 formed on its periphery which engage with friction discs 234 that have opposite side surfaces 235 and 236 that are conical. These friction discs are adapted to be engaged by the V-belts 238.

Frictional engagement is maintained between the belts and the friction discs by end members 240 and 241. The end member 240 is interposed between coupling member 228 and the belt 238 which is furthest to the right. The end member 240 is connected to sleeve 227 through splines 233. The end member 241 seats against a ring member 242 which is interposed between a shoulder formed on shaft 220 and the inner race of bearing 225.

The coupling members 228 and 229 have helical side tooth surfaces and serve to hold the belts 238 in frictional engagement with the discs 234. The belts may run on a solid sheave of known construction not shown in the drawings.

To prevent excessive overload, there is a nut 243 threaded on the periphery of coupling member 229. This nut has a flange portion 245 which is adapted to cooperate with the flange 246 formed on coupling member 228, to limit the axial movement of coupling member 228 away from coupling member 229. A coil spring 247 mounted within the nut and interposed between the nut and the flange 246 serves to apply at all times a light pressure.

In this embodiment of the invention increased efficiency of power transmission is obtained especially at fractional loads as compared with conventional V-belt drives. This results in less wear and in less heat being created. Moreover, instead of having to tighten the belts from time to time by shortening them, as is required with a conventional drive, the friction discs 134 are gradually moved closer together by the pressure so that the V-belts climb somewhat toward the outside of the discs. There is a limit to this adjustment, since it affects the velocity ratio obtained in the drive. The change in ratio can be reduced, if desired, by providing the described axial adjustment on the slow-speed shaft. It can be avoided altogether by providing it on both drive and driven shafts. The present invention permits of obtaining V-belt drives of smaller center distance than in present use by creating axial pressure in the manner described.

While I have disclosed my friction drive per se, the drive may be used in combination with a gear drive, the friction drive working so that the same side of the gear teeth remain continuously in driving contact. This is to avoid backlash, and is especially useful in machine tool drives.

While the invention has been described, then, in connection with certain specific embodiments thereof and certain particular uses therefor, it is to be understood that it is capable of further modification, and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A friction drive comprising a pair of parallel shafts, a toothed coupling member mounted on one of said shafts to rotate therewith but to be movable axially relative thereto, a mating coupling member rotatably mounted on said one shaft and axially movable relative thereto, said coupling members having teeth inclined to the axis of said one shaft, a plurality of friction discs mounted on said mating coupling member to rotate therewith but to be movable axially relative thereto, a pair of abutment members disposed at opposite sides of said friction discs to apply axial pressure thereto, one of said abutment members being secured to said one shaft and the other of said abutment members being mounted to move axially with said mating coupling member, means connected to the first coupling member for limiting axial movement of said coupling members away from one another, and means engaging said discs to transmit torque between said discs and said other shaft.

2. A friction drive comprising a pair of parallel shafts, a toothed coupling member mounted on one of said shafts to rotate therewith but to be movable axially relative thereto, a mating coupling member rotatably mounted on said one shaft and axially movable relative thereto, said caupling members having teeth inclined to the axis of said one shaft, a plurality of friction discs mounted on said mating coupling member to rotate therewith but to be movable axially relative thereto, a pair of abutment members disposed at opposite sides of said friction discs to apply axial pressure thereto, one of said abutment members being secured to said one shaft and the other of said abutment members being mounted to move axially with said mating coupling member, means connected to the first coupling member and which is adjustable axially relative thereto for limiting axial movement of said coupling members away from one another, and means engaging said discs to transmit torque between said discs and said other shaft.

3. A friction drive comprising a pair of parallel shafts, a toothed coupling member mounted on one of said shafts to rotate therewith but to be movable axially relative thereto, a mating coupling member rotatably mounted on said one shaft and axially movable relative thereto, said coupling members having teeth inclined to the axis of said one shaft, spring means for holding the first coupling member in a definite axial position, means for limiting axial movement of the two coupling members away from each other, a plurality of friction discs mounted on said mating coupling member to be movable axially relative thereto, a pair of abutment members disposed at opposite sides of said friction discs to apply axial pressure thereto, one of said abutment members being secured to said one shaft and the other of said abutment members being mounted to move axially with said mating coupling member, and means engaging said discs to transmit torque between said discs and said other shaft.

4. A friction drive comprising a pair of parallel shafts, a toothed coupling member mounted on one of said shafts to rotate therewith but to be movable axially relative thereto, said one shaft having a shoulder provided thereon, a mating coupling member rotatably mounted on said one shaft and axially movable relative thereto, said coupling members having teeth inclined to the axis of said one shaft, spring means for holding the first coupling member in a definite axial position against said shoulder, means connected to the first coupling member for limiting axial movement of the coupling members away from one another, a plurality of friction discs mounted on said mating coupling member to be movable axially relative thereto, a pair of abutment members disposed at opposite sides of said friction discs to apply axial pressure thereto, one of said abutment members being secured to said one shaft and the other of said abutment members being mounted to move axially with said mating coupling member, and means engaging said discs to transmit torque between said discs and said other shaft.

5. A friction drive comprising a pair of parallel shafts, a toothed coupling member mounted on one of said shafts to rotate therewith but to be movable axially relative thereto, a mating coupling member rotatably mounted on said one shaft and axially movable relative thereto, said coupling members having teeth inclined to the axis of said one shaft, spring means for holding the first coupling member in a definite axial position, means connected to the first coupling member, which is adjustable axially relative thereto, for limiting axial movement of the coupling members away from one another, a plurality of friction discs mounted on said mating coupling member to be movable axially relative thereto, a pair of abutment members disposed at opposite sides of said friction discs to apply axial pressure thereto, one of said abutment members being secured to said one shaft, and the other of said abutment members being mounted to move axially with said mating coupling member, and means engaging said discs to transmit torque between said discs and said other shaft.

6. A friction drive comprising a shaft, a toothed coupling member mounted on said shaft to rotate therewith but to be movable axially relative thereto, a mating coupling member mounted on said shaft, said coupling members having teeth whose mating sides are inclined to the axis of said shaft, spring means for holding the first coupling member in a definite axial position against a shoulder provided on said shaft, a plurality of discs, which are tapered in cross-section, mounted on said mating coupling member to rotate therewith but to be movable axially relative thereto, and means for frictionally engaging the sides of said discs to transmit torque between said discs and another shaft.

7. A friction drive comprising a shaft, a member which has side tooth surfaces inclined to the axis of said shaft and which is secured to said shaft to rotate therewith but to be movable axially relative thereto, a mating member, a plurality of discs of tapered cross-section mounted on said mating member to be rotatable therewith but to be movable axially relative thereto, means on said mating member adapted to transmit axial motion of said mating member to said discs, an abutment member secured to said shaft to limit axial motion of the discs, a spring for holding said first-named member in a definite axial position against a shoulder provided on said shaft, a stop for limiting axial motion of said two members away from one another, said spring being designed to yield at a pressure equal to the maximum pressure to be used in the drive, and means for frictionally engaging the sides of said discs to transmit torque between said discs and another shaft.

8. A friction drive comprising a shaft, a pair of members which are adapted to move relative to one another along and about the axis of said shaft, one of said members being connected to said shaft to rotate therewith but to be movable axially relative thereto, a plurality of discs of tapered cross-section mounted on the other member, a spring for holding the first member in a definite axial position against a shoulder provided on said shaft, said spring being designed to yield at the maximum pressure to be used in the drive, a stop for limiting relative motion of said two members away from one another, and means for frictionally engaging the sides of said discs to transmit torque between said discs and another shaft.

9. A friction drive comprising a shaft, a pair of members which are adapted to move relative to one another along and about the axis of said shaft, one of said members being connected to said shaft to rotate therewith but to be movable axially relative thereto, a plurality of discs of tapered cross-section mounted on the other member to rotate therewith but to be movable axially relative thereto, a spring for holding the first member in a definite axial position against a shoulder provided on said shaft, said spring being designed to yield at the maximum pressure to be used in said drive, a stop for limiting the relative movement of said members away from one another, means for frictionally engaging the sides of said discs to transmit torque between said discs and another shaft, and means for adjusting said discs axially toward one another to compenate for wear of the discs.

10. A friction drive comprising a pair of shafts, a pair of members which are adapted to move relative to one another along and about the axis of one of said shafts, said one shaft being provided with a shoulder, one of said members being connected to said one shaft to rotate therewith but to be movable axially relative thereto, a plurality of discs of tapered cross-section mounted on the other member to rotate therewith but to be movable axially relative thereto, a plurality of discs of tapered cross-section mounted on the other member to rotate therewith but to be movable axially relative thereto, mating discs for transmitting torque to the other shaft, means carried by the other member and means connected to said one shaft for engaging the two end members of the mating discs to apply contact pressure between said discs, said last-named means being adjustable axially on said one shaft to compensate for wear of the discs, a spring for holding the first member in a definite axial position against said shoulder, said spring being designed to yield at the maximum pressure to be used in said drive, and a stop for limiting the relative movement of said members away from one another.

11. A friction drive comprising a pair of shafts, a pair of members which are adapted to move relative to one another along and about the axis of one of said shafts, one of said members being connected to said one shaft to rotate therewith but to be movable axially relative thereto, a plurality of discs of tapered cross-section mounted on the other member to rotate therewith but to be movable axially relative thereto, mating discs for transmitting torque to the other shaft, separate means carried by the other member and connected to said one shaft, respectively, for engaging the two end members of the mating discs to apply contact pressure between said discs, a nut threaded on said one shaft for adjusting said last-named means to compensate for wear of the discs, a spring for holding the first member in a definite axial position against a shoulder provided on said shaft, and means adjustably threaded on the first member to limit relative movement of said members away from one another.

12. A friction drive comprising a pair of shafts, a pair of mating toothed coupling members having teeth whose profiles are inclined to the axis of said coupling members, one of said coupling members being connected to one of said shafts to rotate therewith but to be movable axially relative thereto and the other coupling member being mounted for rotation and axial movement relative to said one shaft, a plurality of friction discs connected to the latter coupling member to rotate therewith but to be movable axially relative thereto, mating discs alternating with said first-named discs and frictionally engaging the same to transmit torque between the first-named discs and the other shaft, means connected to the second coupling member to move therewith to effect contact pressure between said discs, a spring for holding the first-named coupling member in a definite axial position, said spring being designed to yield at the maximum pressure to be used in the drive, a stop for limiting the relative motion of the coupling members away from one another, and a light spring disposed between said coupling members and tending to separate said coupling members to maintain said discs in engagement, and means for adjusting the distance between mating discs to compensate for wear.

13. A friction drive comprising a pair of shafts, a plurality of discs of tapered cross-section disposed coaxially with one shaft and operatively connected thereto, mating discs operatively connected to the other shaft and adapted to frictionally engage the tapered sides of the first discs to transmit torque between the shafts, a torque loader for creating axial pressure between the discs to effect such frictional engagement, and means for releasing said pressure to disengage the drive, comprising a lever rotatable about the axis of one shaft and operatively connected to said torque loader.

14. A friction drive comprising a pair of shafts, a plurality of discs of tapered cross-section disposed coaxially with one shaft and operatively connected thereto, mating discs operatively connected to the other shaft and adapted to frictionally engage the tapered sides of the first discs to transmit torque between the shafts, a torque loader and an abutment for creating axial pressure between the discs to effect such frictional engagement, means for releasing said pressure to disengage the drive, and means for adjusting said abutment axially to compensate for wear of the friction discs.

15. A friction drive comprising a pair of shafts, a plurality of discs of tapered cross-section disposed coaxially with one shaft, mating discs operatively connected to the other shaft and adapted to engage frictionally the tapered sides of the first discs to transmit torque between the first discs and the second shaft, a pair of mating toothed coupling members, which are axially movable on the first shaft and which serve to transmit torque from the first shaft to the first-named discs and which on axial movement in one direction create axial pressure between both sets of discs to effect said frictional engagement, spring means for holding one of said coupling members pressed against a shoulder on said one shaft, and means for limiting positively movement of the coupling members away from one another.

16. A friction drive comprising a pair of shafts, a plurality of discs of tapered cross-section disposed coaxially with one shaft and operatively connected thereto, means for frictionally engaging said discs on their tapered sides along parts only of their peripheries to transmit torque between said discs and the other shaft, means for creating axial pressure between the discs increasing with increase in the torque transmitted, and means for releasing such pressure including a lever movable between stops, a screw and a nut, and a fine-tooth clutch for connecting the lever with one of the two last-named elements.

17. A friction drive comprising two sets of mating friction discs mounted, respectively, on two parallel axes, the two sets of discs being respectively, of different diameter, and the discs of each set having opposite side surfaces which converge toward the peripheries of the discs, a rotary member to which the larger diameter set of discs is secured to rotate therewith and to be axially movable thereon, a shaft coaxial with the smaller diameter set of discs, a face coupling member mounted on said shaft in an axially fixed position to rotate therewith, a sleeve mounted on said shaft for axial and angular movement thereon, a face coupling member secured to said sleeve and adapted to engage the first-named coupling member to form therewith a torque loader, said face coupling members having outside diameters larger than the outside diameter of the smaller set of friction discs, and said smaller set of friction discs being mounted on said sleeve to rotate therewith and to be movable axially thereon.

18. A friction drive comprising a pair of parallel shafts, a toothed face coupling member secured to one of said shafts to rotate therewith, a sleeve mounted on said shaft to be movable about and along the axis of said shaft, a face coupling member secured to said sleeve and adapted to engage the first-named coupling member to form therewith a torque loader, a plurality of identical friction discs mounted on said sleeve to rotate therewith and to be movable axially relative thereto, said discs having working surfaces at opposite sides which converge toward the peripheries of the respective discs, and V-belts disposed in the spaces between said discs to engage adjacent sides of adjacent discs to transmit torque between said discs and said other shaft.

ERNEST WILDHABER.

REFERENCES CITED

The following references are of record in the file of this patent:

UNITED STATES PATENTS

| Number | Name | Date |
|---|---|---|
| 1,691,625 | Chilton | Nov. 13, 1928 |
| 1,718,267 | Whittle | June 25, 1929 |
| 2,191,531 | Judelshon | Feb. 27, 1940 |

FOREIGN PATENTS

| Number | Country | Date |
|---|---|---|
| 27,301 | Great Britain | Nov. 27, 1913 |
| 41,594 | Germany | Dec. 6, 1887 |
| 580,189 | France | Aug. 23, 1924 |